Patented Jan. 11, 1927.

1,614,013

UNITED STATES PATENT OFFICE.

FRED S. MULOCK, OF SAN GABRIEL, CALIFORNIA, ASSIGNOR TO UNITED STATES SMELTING, REFINING & MINING COMPANY, OF PORTLAND, MAINE, A CORPORATION OF MAINE.

METHOD OF THAWING GROUND.

No Drawing. Application filed April 12, 1926. Serial No. 101,577.

The present invention relates to methods of thawing ground and is particularly applicable to the cold water thawing methods operating on the general principles disclosed in the patent to Miles, No. 1,339,036 granted May 4, 1920.

The object of the present invention is to provide improvements in the methods of thawing ground with a particular view to obtaining a greater utilization of the available sensible heat of the water thus reducing the time and expense necessary for thawing a given area.

With this object in view, the method of the present invention consists in delivering water to the ground to be thawed at a point below the surface and permitting it to rise through the ground, the delivery of water, however, being not at a continuous rate or under a constant pressure as in prior methods, but intermittently or at a varying rate or under a periodically varying pressure. Under these conditions it has been found that the efficiency of thawing, which is conveniently defined as the percentage of the available heat of the water above freezing which is removed during its passage through the ground, is greatly increased, this increase at times amounting to as much as thirty or forty per cent.

It has been observed, in connection with steady flows of water, that almost invariably there is a rapid decrease in efficiency during the first ten or twelve days of thawing. The explanation of this is believed to be as follows:—When the water point is first set in frozen ground, all the water returning to the surface comes in contact with the ice contained in this frozen ground, being cooled thereby to a low temperature. As the diameter of the thawed hole increases, more and more of the returning water returns to the surface without coming in contact with frozen ground, this water passing through relatively pervious channels in the previously thawed core. The probability of formation and maintenance of these channels is enhanced by the tendency of the water pressure to support portions of the gravels.

According to the present invention, the water pressure is reduced or entirely relieved at intervals, and it has been found that a marked increase in efficiency results therefrom. Although the action of the water below the surface of the earth can not be exactly determined, it is believed that the advantageous results which follow from this intermittent or varying flow, are due largely to the relieving of the supporting water pressure which causes the particles of thawed gravel, previously in a condition of balance, to become unbalanced and settle, thus partially closing the passages in the thawed core. As these passages become closed, there is a greater resistance to flow through the thawed core and a greater portion of the water returns to the surface by way of the more open passage way near to the frozen ground and is cooled thereby. It also appears probable that with a high flow a greater percentage of the water finds its way to this passage way near the frozen ground than with a low flow, and that due to the stagnant period, this water is cooled more than would be the case with the lesser period of contact which would be had were the flow steady and at the high rate.

Inasmuch as the effectiveness of contact between the water and the frozen ground during the period of high flow is determined by the extent to which previously formed pervious channels have been closed during the reduced flow period, it will be seen that the efficiency of the thawing process depends upon the extent to which the flow is reduced, as well as upon the relative durations of the successive periods. In general, it is to be expected that higher efficiencies will be obtained when the water pressure is entirely relieved between successive periods of high flow, it being understood that such entire relief of pressure is a special application of the process of merely reducing the flow, which in this case is reduced to zero. Moreover, it has been found that higher efficiencies will result from regular and approximately equal periodical changes throughout the thawing period than from short periods of reduced flow followed by relatively longer periods of high flow or from short periods of intermittent flow followed by longer periods of uniform flow. These considerations follow from the fact that the effects of the reduced flow are cumulative and that when such periods are of comparatively long duration there will be a greater degree of settling or loosening of the earth in the neighborhood of previously formed channels so that no tendency toward reforming of these or other channels will become apparent for an appreciable time after the high rate of flow is re-established. These matters, however, are influenced by economic considerations and inasmuch as the apparatus is not working at full capacity when the flow is reduced, it will in some cases be desirable to employ periods of high flow which are of considerable duration as compared to the reduced flow periods or to employ intermittent flows followed by comparatively long periods of high flow, even though some loss in efficiency may be entailed. Even under such conditions, it has been found that the intermittent flow has a permanent and cumulative beneficial effect which results in considerably higher efficiencies than can be obtained by steady flows throughout the thawing process. The present invention is, therefore, not limited to regular periodic changes of equal duration throughout the thawing period, but in its broader aspects relates to alternate periods of varying pressures and varying rates of flow which may be of equal or unequal duration and which may follow in regular or irregular succession.

An important feature of the invention resides in the controlling of rates and directions of flow of water in adjacent holes or adjacent rows of holes when the thawing has progressed to such an extent that the holes tend to break through and communicate directly with one another. According to this feature, the periods of flow and retardation are arranged to alternate for the adjacent holes or rows of holes, the periods in each case being approximately equal, so that water is admitted to one set of holes while it is cut off from the other, and vice versa.

Such action is beneficial because after the establishment of communicating passages between the holes, the reversal in direction of water flow between holes with the consequent turbulence adjacent to and in the communicating openings tends to cause considerable settling of the ground near and in the opening and the directing of the water in such a way as to permit it to come in contact with new and unthawed portions, at the same time affording sufficient time of contact between the water and the ground to assure maximum extraction of the available heat energy from the water.

According to the preferred form of the invention when practiced with cold water, the water is conveyed to the ground to be thawed through pipes which are sunk from the surface until they rest on bedrock. The water is delivered under pressure the amount depending upon the nature and depth of the ground and at available temperatures which usually will not be above 60°. The pipes are placed in adjacent staggered rows as illustrated in the Miles patent, the spacing between pipes in the present practice being approximately 32 feet. During the first part of the thawing operation the most effective durations of flow and rest periods will be determined by the nature of the ground to be operated upon as well as by economic and practical considerations. For one type of gravel alternate periods of from ½ to 2 minutes of equal duration have been found to be satisfactory and to give an exceptional high efficiency. It is desirable, however, to increase the flow period to an extent considerably greater than the rest period, providing this can be done without undue decrease in efficiency (since the equipment is idle during the rest period). An effective method consists in alternately producing high and reduced flows in successive short periods of preferably several minutes duration, followed by a relatively long period of uniform high flow, which may extend over a number of hours. The effectiveness of the thawing in any case may be determined by actual temperature measurements of the ingoing and outcoming water and an empirical indication is obtained by observing the relative muddiness of the water, it being apparent that clear water coming to the surface indicates relatively poor efficiency because of the evident lack of contact between the water and virgin (or fresh) gravels.

The thawing is thus continued with relative flow and rest periods of such duration as are best suited for the type of ground which is being worked until communication is established between adjacent rows of holes as evidenced by the surface flow of water in holes to which no water is being admitted. For the remainder of the thawing operation the same periods of flow and rest may be continued, or it may be desirable to employ alternate flow and rest periods of equal duration, the water being first admitted to one row of holes while shut off from the next adjacent row and so on. Under such conditions, the turbulence and agitation accompanying the reversal of the water flow through the communicating passages results in a more rapid thawing of the walls which separate the various rows of holes with a consequent rapid completion of the thawing operation through the entire area.

While the present method is particularly effective when cold water is employed, it is to be understood that it may be used with warm or hot water or other thawing medium. Furthermore, the present invention is not to be limited except where so specified in the claims to the complete cutting off of the flow, it being within the spirit of the invention in its broader sense to vary or alter the rate or other conditions of flow without stopping it altogether.

Having described the invention, what is claimed is:

1. The method of thawing ground which consists in conveying water to the ground to be thawed at a point below the surface and periodically varying the conditions of flow of water to permit readjustment of the thawed material.

2. The method of thawing ground which consists in delivering water to the ground to be thawed at a point below the surface thereof and periodically and alternately reducing and increasing the rate of flow of the water.

3. The method of thawing ground which consists in conveying water to the ground to be thawed at a point below the surface and intermittently stopping the flow of the water to permit the settling of the thawed and loosened material.

4. The method of thawing ground which consists in conveying water below the surface of the ground at separated points between which lies the ground to be thawed, and intermittently reducing the flow of water from one point while maintaining it at another, and then increasing the flow at the first mentioned point and reducing it at the last mentioned point.

5. The method of thawing ground which consists in conveying water below the surface of the ground at separated points between which lies the ground to be thawed and intermittently cutting off the flow of water from one point and establishing it at another and then establishing the flow at the first mentioned point and cutting it off at the last mentioned point.

6. The method of thawing ground which consists in delivering water to the ground to be thawed at a point below the surface thereof, periodically reducing and increasing the rate of flow of the water for a time and thereafter establishing a flow of water at uniform high rate.

In testimony whereof I have signed my name to this specification.

FRED S. MULOCK.